Patented Apr. 1, 1930

1,752,293

UNITED STATES PATENT OFFICE

KARL BRODERSEN AND WERNER EXT, OF DESSAU IN ANHALT, GERMANY, ASSIGNORS, BY MESNE ASSIGNMENTS, TO WINTHROP CHEMICAL COMPANY, INC., OF NEW YORK, N. Y., A CORPORATION OF NEW YORK

FUNGICIDE

No Drawing. Application filed September 27, 1926, Serial No. 138,120, and in Germany October 24, 1925.

The present invention relates to new dry fungicides and is based on the observation that quinones and their derivatives are very effective in combating fungi.

It is known that commercial dry fungicides which contain as active constituents compounds of mercury, copper, arsenic or the like, are not effective against loose and covered smut of oats, i. e., *Ustilago avenæ*, Pers. (Jens) and *Ustilago levis*, Kellermann & Swingle (Magnus).

According to the invention, the spores of smut are completely killed if the grain is treated with a medium containing a quinone compound. Such quinone compounds are for instance benzoquinone, its homologues and analogues, the substitution products of these quinones, such as the halogen-quinones, the products of addition of the quinones with a phenol (the so-called phenoquinones (compare Beilstein, Handbuch der Organischen Chemie, 6th ed., vol. 7, page 615, and Berichte der deutschen Chemischen Gesellschaft, vol. 42, page 1149) or quinhydrones). The quinone compounds may be used alone and in mixture with other substances. The grain is not damaged by the treatment.

The effect of the new fungicide is evident from the following:

An untreated grain having 90–94 per cent germinating capacity was sown on several experimental plots of 8 square metres each; it yielded a crop having 39–41 smutted ears.

Other portions of the grain were powdered with 4 different dry commercial mercurial fungicides which are known to be active against bunt (Tilletia), stripe disease of barley (Helminthosporium) and mould (Fusarium); the germinating capacity of this treated grain was 91.5–92.5 per cent and the crop contained 21–46 smutted ears.

Other portions of the grain were treated with a powder containing 4-chlorphenoquinone

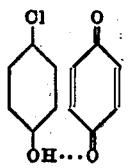

the germinating capacity was 91 per cent and the crop contained 0–3 smutted ears.

What we claim is:

1. A dry fungicide containing a quinone compound.
2. A dry fungicide containing a quinone compound of the benzene series.
3. A dry fungicide containing an addition product of a quinone to a phenol.
4. A dry fungicide containing a halogenated quinone compound.
5. A dry fungicide containing a halogenated addition product of a quinone to a phenol.
6. A dry fungicide containing a chlorphenoquinone compound.
7. A dry fungicide containing 4-chlorphenoquinone.

KARL BRODERSEN.
WERNER EXT.